United States Patent
Crasta et al.

(10) Patent No.: US 10,572,268 B2
(45) Date of Patent: *Feb. 25, 2020

(54) NETWORK BOOTING IN A PEER-TO-PEER ENVIRONMENT USING DYNAMIC MAGNET LINKS

(71) Applicant: INTERNATIONAL BUSINESS MACHINES CORPORATION, Armonk, NY (US)

(72) Inventors: Alol A. Crasta, Bangalore (IN); Harshal S. Patil, Bangalore (IN); Kishorekumar G. Pillai, Bangalore (IN); Christoph Raisch, Gerlingen (DE); Nishant Ranjan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/494,013

(22) Filed: Apr. 21, 2017

(65) Prior Publication Data
US 2018/0307501 A1   Oct. 25, 2018

(51) Int. Cl.
*G06F 9/4401* (2018.01)
*H04L 29/08* (2006.01)
(Continued)

(52) U.S. Cl.
CPC ........ *G06F 9/4416* (2013.01); *G06F 9/44505* (2013.01); *H04L 67/06* (2013.01);
(Continued)

(58) Field of Classification Search
CPC ...... G06F 8/63; G06F 9/4416; G06F 9/44505; G06F 21/10; H04L 67/06; H04L 67/104; H04L 67/1044
See application file for complete search history.

(56) References Cited

U.S. PATENT DOCUMENTS 7,051,326 B2   5/2006   Goodman
7,565,517 B1   7/2009   Arbon
(Continued)

FOREIGN PATENT DOCUMENTS

EP   2127325   11/2012

OTHER PUBLICATIONS

List of IBM Patents or Patent Applications Treated as Related, Nov. 17, 2017, 2 pages.
(Continued)

*Primary Examiner* — Terrell S Johnson
(74) *Attorney, Agent, or Firm* — Heslin Rothenberg Farley & Mesiti P.C.; William A. Kinnaman, Esq.

(57) ABSTRACT

A method, computer program product, and system includes a processor(s) connecting a first computer system to a boot swarm, initiating formation of a peer to peer network. The processor(s) receive a request from a second computer system, a request for a file. The processor(s) configure the second computer system, including implementing a client application hosted from a resource in the first computer system, to facilitate the second computer system joining the peer to peer network. The processor(s) determine immediate peer(s) in the peer to peer network available to provide the file to the second computer system. The processor(s) generate a magnet link that includes a listing of address(es) of the immediate peer(s), ranking address(es) from best source to worst source for downloading the file. The processor(s) provide the second computer system with the magnet link to utilize in downloading the file from a peer.

9 Claims, 8 Drawing Sheets

(51) Int. Cl.
*G06F 9/445* (2018.01)
*G06F 8/61* (2018.01)

(52) U.S. Cl.
CPC .............. *H04L 67/104* (2013.01); *G06F 8/63* (2013.01); *H04L 67/1044* (2013.01)

(56) References Cited

U.S. PATENT DOCUMENTS

| | | |
|---|---|---|
| 8,095,630 B1 | 1/2012 | Schettino et al. |
| 8,468,387 B2 | 6/2013 | Sosnosky et al. |
| 2012/0244989 A1 | 9/2012 | Winkelmann |
| 2013/0167140 A1 | 6/2013 | Androncik et al. |
| 2014/0195652 A1* | 7/2014 | Yerkes .................... H04L 67/06 709/219 |
| 2014/0289862 A1* | 9/2014 | Gorfein .................. G06F 21/10 726/26 |

OTHER PUBLICATIONS

Crasta, Alol A., "Network Booting in a Peer-to-Peer Environment Using Dynamic Magnet Links," U.S. Appl. No. 15/814,746, filed Nov. 16, 2017, pp. 1-45.

Mell et al., "The NIST Definition of Cloud Computing", National Institute of Standards and Technology, U.S. Dept. of Commerce, NIST Special Publ. 800-145, Sep. 2011, 7 pages.

Lee et al., Automating OS/SW Provisioning for Building Enterprise Data Center, ICACT2011, Feb. 13-16, 2011; pp. 859-862.

* cited by examiner

US 10,572,268 B2

NETWORK BOOTING IN A PEER-TO-PEER ENVIRONMENT USING DYNAMIC MAGNET LINKS

BACKGROUND

The invention relates to boot image distribution over a peer-to-peer (P2P) network. When booting computing nodes in multi-processor computing systems, a centralized server (i.e., a tracker), maintains information in the form of a list of peer computer systems (i.e., seeders) that holds images and are ready to serve these images to boot resources in the network. Because the tracker is centralized, it creates a single point of failure within the network. Although the tracker provides the list of seeders, the list is updated periodically and there is no real-time data because a system aspiring to receive boot image via the peer-to-peer network (i.e., a requestor) will take time to converge on the list of active seeders nearest to the requestor. Thus, the tracker maintains a Uniform Resource Identifier (URI) file per boot image, which has information on peer/tracker computer resources in the network that hold the image. To operate, the computer system, as a whole, requires at least one configured boot image server that holds the boot image, explicitly configured in the tracker, for a kick start.

SUMMARY

Shortcomings of the prior art are overcome and additional advantages are provided through the provision of a method for providing a boot image to a requesting computer system on a peer to peer network. The method includes, for instance: connecting, by one or more processors of a first computer system, the first computer system to a boot swarm, initiating formation of a peer to peer network; receiving, by the one or more processors, a request from a second computer system, a request for a file, wherein the file is selected from the group consisting of: an operating system file and a firmware file; configuring, by the one or more processors, the second computer system, wherein the configuration comprises implementing a client application hosted from a resource in the first computer system, to facilitate the second computer system joining the peer to peer network; determining, by the one or more processors, one or more immediate peers in the peer to peer network available to provide the file to the second computer system; generating, by the one or more processors, a magnet link comprising a listing of addresses of the one or more immediate peers, wherein an order of the listing indicates rankings from best source to worst source for downloading the file among the one or more immediate peers; and providing, by the one or more processors, the second computer system with the magnet link to utilize in downloading the file from a peer of the one or more immediate peers.

Shortcomings of the prior art are overcome and additional advantages are provided through the provision of a computer program product for providing a boot image to a requesting computer system on a peer to peer network. The computer program product comprises a storage medium readable by a processing circuit and storing instructions for execution by the processing circuit for performing a method. The method includes, for instance: connecting, by the one or more processors of a first computer system, the first computer system to a boot swarm, initiating formation of a peer to peer network; receiving, by the one or more processors, a request from a second computer system, a request for a file, wherein the file is selected from the group consisting of: an operating system file and a firmware file; configuring, by the one or more processors, the second computer system, wherein the configuration comprises implementing a client application hosted from a resource in the first computer system, to facilitate the second computer system joining the peer to peer network; determining, by the one or more processors, one or more immediate peers in the peer to peer network available to provide the file to the second computer system; generating, by the one or more processors, a magnet link comprising a listing of addresses of the one or more immediate peers, wherein an order of the listing indicates rankings from best source to worst source for downloading the file among the one or more immediate peers; and providing, by the one or more processors, the second computer system with the magnet link to utilize in downloading the file from a peer of the one or more immediate peers.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
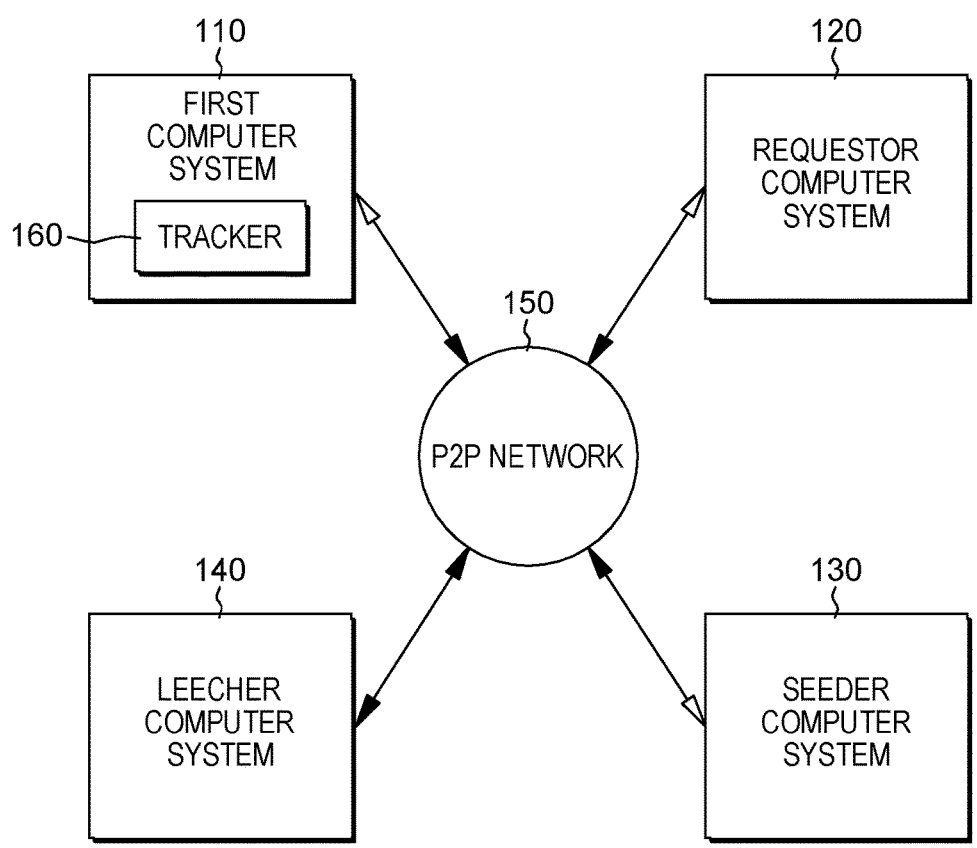
FIG. 1 is an illustration of a technical environment into which various aspects of an embodiment of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
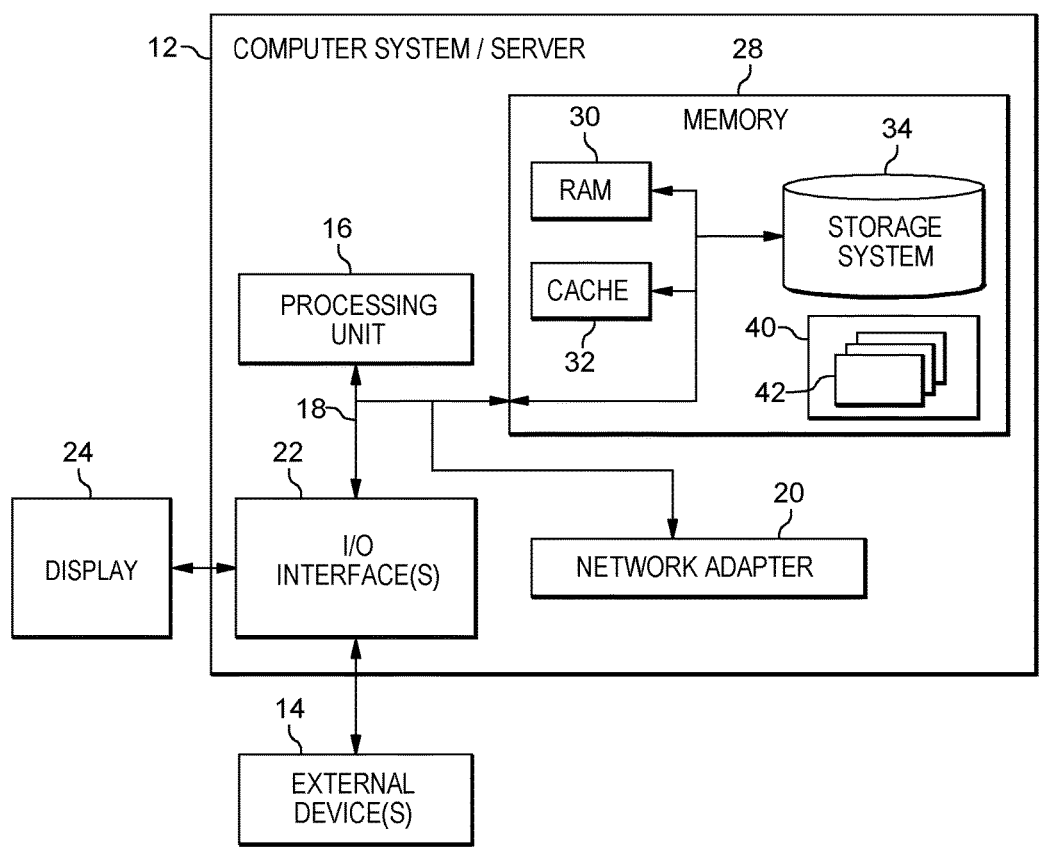
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Throughout this disclosure, a boot image is referred to and is an example of an operating system or firmware file. As illustrated in the descriptions and figures that follow, embodiments of the present invention serve these boot images, which are each complete (singular) files, in a secure, scalable, and optimized manner. The singular file aspect of various embodiments of the present invention can be contrasted with methods that split a boot image into two or more files or pieces. As understood by one of skill in the art, when a boot image, as understood herein, is split in this manner, the resultant files are no longer a boot image. Techniques described herein can be utilized in embodiments of the present invention to serve operating system or firmware files, including but not limited to, boot images.

In embodiments of the present invention, a computer-implemented method, a computer program product, and a computer system include program code that provides a network boot mechanism that is decentralized, but serves boot images in a secure, scalable, and optimized manner. Specifically, embodiments of the present invention provide a method for boot configuration distribution in a distributed peer-to-peer datacenter environment, having diverse boot images, using an optimized magnet link. Embodiments of the present invention include one or more programs comprising a magnetic link engine (MLE) that establish a peer to peer (P2P) network between computers, which the computers can utilize to obtain an operating system image, based on a magnetic link, and to boot the system utilizing the obtained image. Once the system has been booted, the new operating system instance become a source (i.e., seeder) for operating system images for additional computer systems on the P2P network. In embodiments of the present invention, the one or more programs on the MLE: 1) receive a request for a boot configuration from a computer in the network; 2) in response to receiving the request, generate a magnetic link for an operating system image for the computer, based on a list of computers on the network available to boot the computer (i.e., seeders) and add it to a boot configuration for the computer; 3) send the boot configuration to the computer via the network; 4) receive a message from the now-booted computer in the network indicating the completion of the boot; 5) in response to the message, add the now-booted computer to the list of seeders. Thus, embodiments of the present invention provide advantages that are inextricably linked to computing.

As will be discussed herein, embodiments of the present invention provide advantages over existing methods of booting over a P2P network, which represent advancements in computing technology. For contrast, using existing P2P booting methods, boot images are provided by using a torrent file work as follows. This torrent file consists of file information and announces servers. When a computing system enters a network consisting of peer computing systems, the computing system loads the announce servers from torrent file and gets the peer and seeder information. The announce servers collect this information periodically and not real time, and do not prune the list. Therefore, when the entire peer list is loaded by the torrent client, not all of the peers listed are active (i.e., viable sources for the requested boot image). In these existing systems, the torrent client then attempts to contact all the peers from the list to identify the few active ones. Based in receiving these contacts, the active peers give information about such that the other active peers, and the torrent client have correct information about the P2P network participants. After the torrent client is updated, depending on a distance matrix, a requestor computing system can download a boot image from a peer/seeder. In contrast to this existing method, embodiments of the present invention represent an improvement in the efficiency and efficacy of booting in a P2P network environment at least before utilizing a dynamic magnet link, which is discussed herein, in accordance with aspects of embodiments of the present invention, enables a requestor to receive a boot image without any peer discovery or verification preceding this action.

Embodiments of the present invention provide advantages over existing systems of booting computing systems over a network. One such advantage is that in some embodiments of the present invention, each computing system in need of booting is can be provided with a boot image by its nearest peer in a P2P network. Another advantage is that one or more programs in the present invention simplify peer discovery for a boot image server with the use of magnet links. Utilization of these magnet links is made intelligent with real-time trustable peers using dynamic magnetic links using a magnet link engine (MLE). This MLE alleviates boot storms with tunable load balancing with MLE. Another advantage of certain embodiments of the present invention is that aspects of the invention can co-exist with an existing dynamic IP subsystem, seamlessly. Also, in embodiments of the present invention, when one or more programs provide a given computer system with sources for a given image on a P2P network, the sources provided are all viable.

FIG. 1 provides an overview of a computing environment 100 in which aspects of embodiments of the present invention can be implemented. FIG. 1 is included both to highlight existing issues with booting machines in a peer-to-peer environment and illustrate how some of these issues can be mitigated through the utilization of aspects of embodiments of the present invention.

Resident in the computing environment is a first computer system 110, which is the first member of a peer-to-peer boot network. One or more programs executing on at least one processing circuit of the first computer system 110 may serve host configuration parameters in the network (e.g., host a Dynamic Host Configuration Protocol (DHCP) Server) for initial boot up purposes and/or provide optimized boot image sources. The computing environment 100 also includes a requestor computer system 120. The requestor computer system 120 aspires to receive a boot image via a peer-to-peer (P2P) network connection. The requestor computer system 120 can be understood as an "unbooted client" in the context of the computing environment 100. The computing environment 100 also include a seeder computer system 130. A seeder computer system 130 is a requestor computer system 120, which has already acquired a boot image and one or more programs executing on at least one processing circuit of the seeder computer system 130 can share the boot image with other peer requestors. The computing environment also includes leecher computer system 140, which like seeder computer system 130, has already acquired a boot image, but unlike seeder computer system 130, leecher computer system 140 does not share this image with other computing resources with the computing environment 100.

The computing environment 100 of FIG. 1 is a single network consisting of peer computing systems, referred to as a swarm. As understood by one of skill in the art, P2P computing or networking describes a distributed application architecture that partitions tasks or workloads between peers. Peers are equally privileged, equipotent participants in the application and form a peer-to-peer network of nodes. All the computer systems pictured in FIG. 1, including the first computer system 110, the requestor computer system 120, the seeder computer system 130, and the leecher computer system 140 are peers or peer computers within the computing environment 100. A P2P network 150 may include multiple leecher and seeders as FIG. 1 displays one of each merely for illustrative purposes.

The computing environment 100 of FIG. 1 also includes a tracker 160, which is a centralized computing resource, e.g., a server, which maintains a list of P2P computer systems that hold images and are ready to serve these images. One or more of the computer systems may be a mainframe, including but not limited to an IBM® zSeries® system. IBM® and zSeries® are registered trademarks of International Business Machines Corporation, Armonk, N.Y., US.

In the computing environment 100, various mechanisms and processes are utilized to boot the computer systems with images. For example, a Preboot Execution Environment (PXE), which is a client/server interface, allows networked computers, such as the systems pictured in FIG. 1, which are not yet loaded with an operating system (OS) to be configured and booted remotely by an administrator. The platform hardware, the hardware in servers of the computer systems, include infrastructure for system management purposes, including but not limited to, supporting remote booting of the systems and providing a system remote control facility. In the computer systems, firmware code referred to as a Network Boot Loader (NBL) receives initial hardware configuration and an initial OS/hypervisor image from the network.

More granular control of boot processes in complex computing systems, such as mainframes, is desirable. Certain computing resources, including but not limited to, IBM® zSeries® systems, exploit the PXE boot standard of booting a logical partition (LPAR) with an OS image. A LPAR is the division of a computer's processors, memory, and storage into multiple sets of resources so that each set of resources can be operated independently with its own operating system instance and applications. However, when the computer system is a mainframe, there are unique challenges when managing partitions of a computer system, for example, using partition management tools, including but not limited to IBM®'s Dynamic Partition Manager. These unique challenges differ from partition management in open systems. For example, in a mainframe, a specialized boot loader (e.g., based on Linux) is moved from a management console to the LPAR memory for enabling the PXE boot, which raises significant boot time for the LPAR. Because there are no controls from mainframe management on the entire boot activity, if the boot fails for any reason, restart of entire partition activation essential is the only remedial action. Hence, a computer system that includes program code that provides a network boot mechanism that is decentralized, but serves boot images in a secure, scalable, and optimized manner is desirable.

Returning to FIG. 1, this computing environment 100 can be understood when in the context of certain existing network booting techniques, where a computer system, e.g., the requestor computer system 120, acquires an image of an operating environment from a remote image source server, such as the seeder computer system 130, by using PXE protocol. The PXE services can be used for a variety of functions including, but not limited to: recovering a software system to a previous state, installing an OS for first time use, resetting a system to a different OS image, and/or migrating a system to a newer OS image. When utilizing network booting techniques in a P2P environment, because a given computing device can obtain an image from one or more image sources, the tracker 160 maintains information about the peer computer systems that are seeder computer systems 130 because a seeder computer system 130 hold images and can also serve as the boot image for other computing devices.

PXE-based methods for booting systems have some known challenges. For example, because PXE-based methods utilize file serving from a single location, that single location becomes a single point of failure. Thus, malicious attacks can paralyze the PXE server causing Denial of Service. Also, this single service point may be unable to handle large scale concurrent requests and can drop image requests when occurrence overwhelmed. This solution limits scalability in large environments, particularly during a virtualization sprawl (VM sprawl), which occurs when a large amount of virtual machines exist on a network without the proper information technology (IT) management or control.

Utilizing a tracker 160 to boot network resources in a P2P computing environment, such as the computing environment 100 of FIG. 1, also presents certain challenges. The tracker 160, like file serving from a single location in PXE-based approaches, is a single point of failure entity. Another challenge is that the tracker 160 provides a list of computing resources that is periodic, rather than being updated in real-time. Thus, a requestor computer system 120 may take time on a list of active seeders, such as seeder computer system 130, nearest to the requestor computer system 120. The tracker 160 also maintains a URI file per boot image, which has information on peer/tracker computer systems that holds the image. In addition to issues with the tracker 160, another issue with P2P networks is that a computer system needs at least one configured boot image server that holds the boot image, explicitly configured in the tracker, for kick start.

Figure 2:
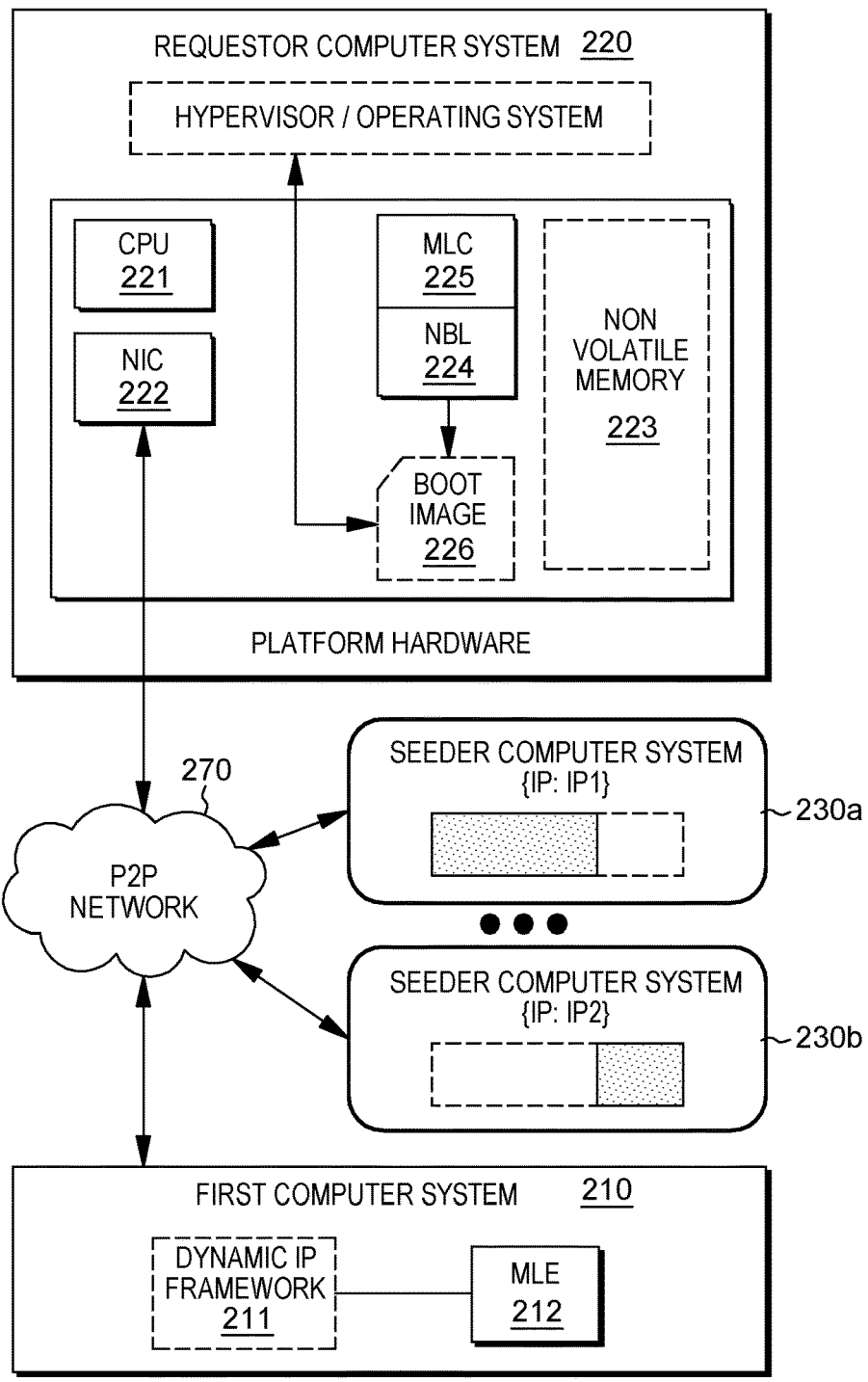
FIG. 2 is an illustration of a technical environment into which various aspects of an embodiment of the present invention may be implemented.

FIG. 2 illustrates a computing environment 200 in which aspects of embodiments of the present invention have been implemented. Embodiments of the present invention integrate P2P network 270 communication with a client side dynamic internet protocol (IP) system. Embodiments of the present invention additionally integrate a P2P network 270 to network boot loader to assist one or more programs in determining in which order boot image source IP should be used to download from.

FIG. 2 depicts a cluster of P2P computers aspiring to boot from a P2P network 270. As in FIG. 1, the computers include a first computer system 210, a requestor computer system 220, and, in this example, two seeder computer systems 230a-230b. The system boot characterized in FIG. 2 is accomplished via an IP based network of interconnected elements, i.e., the P2P network 270. This computing environment 200 also includes servers that host various boot image distributions (e.g., OS image/firmware images, etc.) and the dynamic IP servers. All peers (nodes) on the P2P network have access to the seeder computer systems 230a-230b, which are P2P computing systems that have completed downloads of images and have become integral nodes that host the distributed boot image.

Although only one requestor computer system 220 is pictured, for illustrative purposes, embodiments of the present invention can be utilized to provide booting over a P2P network 270 to multiple peers that are requestor computer systems 220. Each computing nodes characterized as a requestor computer system 220 is seeking a boot image over the network. As illustrated in FIG. 2, each requestor computer system 220 includes at least one computer processing unit (CPU) 221, one or more memories (not pictured), and a network interface card (NIC) 222, BIOS, which can host a network boot loader (NBL) 224 and a Magnet Link Client (MLC) 225, and a non-volatile storage memory 223, which can persist a boot image 226 after it is used for booting purposes (e.g., for seeding purposes). In embodiments of the present invention, the MLC comprises one or more programs that provide: 1) integration of P2P network 270 communication with the client side (e.g., first computer system 210) of dynamic IP system and; and 2) integration to the P2P network 270 to the NBL 224 to assist in which order a boot image 226 source IP should be used to download from.

FIG. 2 also includes a first computer system 210, which is a P2P computing system in the network, which provides the ability to accommodate a dynamic IP subsystem. In this dynamic subsystem, also referred to as a dynamic IP framework 211, one or more programs executing on a processing circuit of the first computing system 210, provide network configuration to computing nodes on the P2P network 270. The first computer system 210 also includes Magnet Link Engine (MLE) 212, which works with the dynamic IP subsystem to ensure that each requestor computer system 220 utilizes the proper (e.g., most efficient) boot image servers when booting. For example, in embodiments of the present invention, one or more programs in the dynamic IP framework 211 executing on one or more processing resources of the first computer system 210, utilize the MLE 212 to obtain an IP address of available boot sources on the P2P network 270. The MLE provides the one or more programs with tunable configuration parameters, including but not limited to, the number of boot image sources a requestor computer system 220 can depend on (referred to herein as IP_THRESHOLD) and the number of times a requestor computer system 220 can appear a list of boot image sources (referred to herein as IP_POINTS). The MLE 212 provides these one or more programs with an optimized boot image source list and in determining the correct boot source, the MLE 212 can account for runtime configuration parameters for load balancing purpose.

Although the computing environment 200 of FIG. 2 depicts one MLE 212, in embodiments of the present invention, a MLE 212 can be implemented one per subnet or it can serve many subnets. In some embodiments of the present invention, a magnet link, which will be discussed in more detail below, initially includes just the IP of a file server containing a boot image. However, one or more programs referred to as MLE 212, maintains a list of IPs per subnet which have requested a particular boot image. For example, a magnet link may contain a list of "M" IP addresses. In the example below M=4. In some embodiments of the present invention, the last IP address listed address on a list maintained by an MLE 212 is the file server IP where the images are hosted. When M=4, when the one or more programs in the MLE 212 generate a magnet link, the one more programs select three (3) IPs are from the list along with IP of the file server. The one or more programs generate a magnet link that includes these 4 IPs, and provides the magnet link to the requestor computer system 220 in response to receiving a request from the requestor computer system 220 for a given boot image 226. If the one or more programs determine, based on the list, that less than 3 IP addresses (e.g., of the subnet) are available as sources of a given boot image are part of Magnet link given to the requester of the particular boot image, the one or more programs generate a magnet link with from the list of IP addresses of the best matched subnet.

In some embodiments of the present invention, the longest match will decide which IP address appears first in the magnet link. For example, a given MLE 212 serves a subnet that includes the following IPs: A) 10.21.1.0; B) 10.21.2.0; C) 10.8.5.0; and D) 9.67.3.0. A requestor computer system 220 from subnet A requests a boot image. In this example, if the subnet A does not have 3 IPs for this particular image, the one or more programs of the MLE 212 utilize IP addresses from the subnet B (longest match of 10.21.0.0), rather than C, or D, which have an eight (8) bit and zero (0) bit match, respectively. Utilizing this order, if A and B together do not have three (3) IP addresses from which the given boot image is available, the one or more programs take IPs from C's list. Also, if A, B and C together don't have three (3) IP addresses from which the given boot image in available, the one or more program generate a magnet link that includes IP addresses from D.

In some embodiments of the present invention, the one or more programs of the magnet link engine 212 generate a magnet link by taking into account load-balancing within a subnet or group of subnets. For example, to maintain load balancing, each IP address utilized in a magnet link is assessed "N" points before moving to the next IP address. The one or more programs will assign more points to the first IP address included in a magnet link. In one example, the one or more programs will calculate how many points to assign an IP address in the list as 4—the numerical position in the magnet link. Thus, the one or more programs assign an IP address in the first position in a magnet link three (3) points, the IP address in the second position in a magnet link two (2) points, and the IP address in the third position in a magnet link one (1) point. For load balancing purposes, one a given IP address has been assigned more "N" points or more (e.g., a threshold number of points), the one or more programs will place the IP address last the list of IP addresses that it utilizes in a given magnet link. Then, in the event the new IP address requests a given boot image, the one or more programs generate a magnet link with the IP address in the fourth (e.g., Mth place). If the list contains less that "M" IP addresses, this IP address will appear last. To change and control the load balancing policy of the one or more programs, the point system and threshold N can be altered.

An advantage of embodiments of the present invention is that the one or more programs provide, in a magnet link, only available, i.e., "alive," sources for a particular boot image to a requestor computer system 220. When the one or more programs enable the first computer system 210 to join a P2P boot swarm, the one or more programs determine which members of the P2P network represent alive peers and seeders for a particular boot image. When the one or more programs determine that a given peer has left the P2P boot swarm, the one or more programs remove this peer's IP address from the list the one or more programs maintain in the MLE 212.

Figure 3:
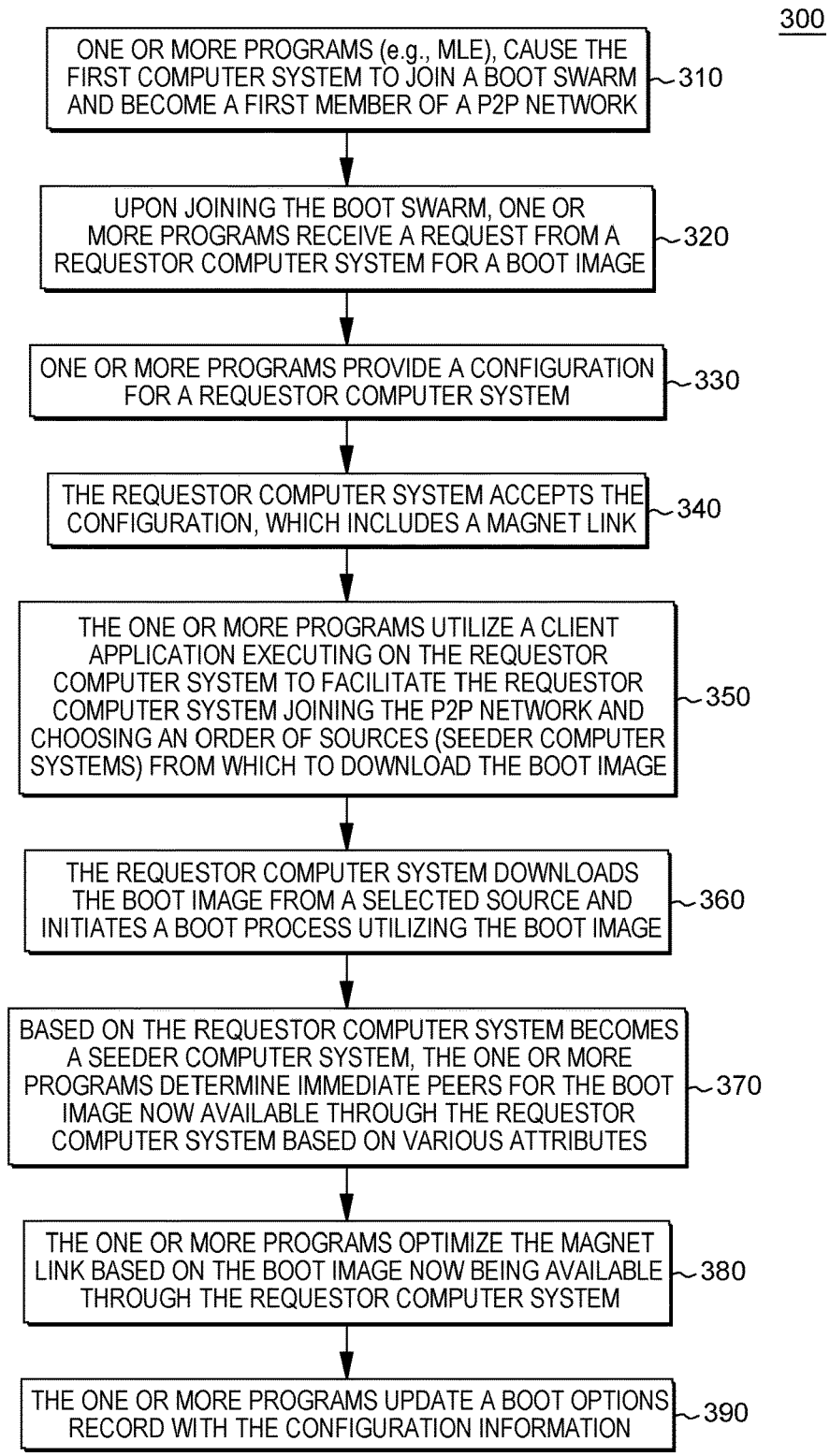
FIG. 3 is a workflow illustrating certain aspects of an embodiment of the present invention.

FIG. 3 is a workflow 300 that illustrates certain aspects of some embodiments of the present invention. For ease of understanding, throughout the workflow 300, aspects of the computing environment 200 of FIG. 2 are referenced. The utilization of this computing environment 200 for illustrative purposes in not intended to suggest any limitations on the environments into which aspects of embodiments of the present invention may be implemented. This example is utilized merely to enhance understanding of aspects illustrated.

Referring to FIG. 3, in some embodiments of the present invention, one or more programs, which may be understood as the MLE 212, executed by a processing resource of the first computer system 210, cause the first computer system 210 to join a boot swarm and become a first member of the P2P network 270 (310). Thus, one or more programs of the first computing system 210 create a P2P boot network (i.e., a boot swarm).

Upon joining the boot swarm, the one or more programs receive a request from a requestor computer system 220 for a boot image (320). The one or more programs provide a configuration for a requestor computer system 220 (330). In an embodiment of the present invention, the configuration is an IP configuration that includes a magnetic link.

A magnet link refers to a hex encoded SHA-1 hash of a file in question. Although the magnet link indicates a particular file, to access the file, one or more programs of a client application carries out an availability search. It a standard magnet link, parameters defined include:

"dn"—(display name): a filename to display to the user, for convenience

"kt"—(keyword topic): a general search, specifying search terms, rather than a particular file "mt"—(manifest topic): a URI pointing to a manifest (i.e., a list of further items)

In magnet links, application-specific experimental parameters, begin with "x." The standard for magnet links allows for multiple parameters of the same type to be used by appending "0.1", "0.2", etc. to the parameter name.

In embodiments of the present invention, the one or more programs executing on the first computer system 210 issue requester computer systems appropriate magnet links. Specifically, one or more programs that comprise the MLE 212 as well as the dynamic IP framework 211 of the first computer system 210 provide a dynamic IP configuration to the requestor computer system 220 that includes the aforementioned magnetic link. The one or more programs may provide a magnetic link per image, based on determining a best available seed image for the boot image from seeder computer systems 230a-230b, with available seed images on the P2P network 270. Thus, the magnetic link includes an IP address list that includes the best seed computer system 230a-230b and attributes of the boot image, including but not limited to, hash, display name, and/or size of the image. Below is an example of a magnetic link provided in an embodiment of the present invention that references seeder computer systems 230a-230b in FIG. 2.

magnet:?xt.1=um:sha256:
YNCKHTQCWBTRNJIV4WNAE52SJUQCZO5C&
dn=vmlinux-ubuntu&sz=133535325235&xe=IP1,IP2

As seen in the example above, in some embodiments of the present invention, a magnet link for a given boot image may contain: 1) a unique hash of the boot image; 2) a display name of the boot image; 3) the size of the boot image; and 4) a dynamic list of IP addresses that represent the immediate peer computer system that have the boot image. In the above example, IP1 and IP2, which are the dynamic IP addresses of seeder computer system 230a and seeder computer system 230b, are included in the magnet link.

In case of geographically dispersed datacenters, magnet links can be maintained per data center. These links can be further optimized based on the optimizations techniques mentioned above.

Returning to FIG. 3, in some embodiments of the present invention, the requestor computer system 220 accepts the configuration (e.g., the IP configuration that includes the magnetic link) (340). Based on requestor computer system 220 accepting the configuration, the one or more programs utilize an MLC 225 (a client application, the MLE being the server of this application client/server application) to facilitate the requestor computer system 220 joining the P2P network 270 and choosing an order of sources (seeder computer systems 230a-230b) from which to download the boot image 226 (350). The requestor computer system 220 downloads the boot image 226 from a selected source and initiates a boot process utilizing the boot image (360). Based on completing the boot process, the requestor computer system 220 becomes a seeder computer system for the boot image.

The functionality of the MLE 212 is improved subsequent to assisting in booting the requestor computer system 220. Based on the requestor computer system 220 becoming a seeder computer system, the one or more programs determine immediate peers for the boot image now available through the requestor computer system 220 based on various attributes (370). These attributes include, but are not limited to subnet affinity, load factor, and/or availability on the P2P network 270. The one or more programs optimize the magnet link based on the boot image now being available through the requestor computer system 220 (380). In embodiments of the present invention, the one or more programs optimize the magnet link by appending the requestor computer system's 220 to a dynamic IP address list that is part of the magnet link. The dynamic IP list identifies the computer systems on the P2P network 270 that can make the boot image available to requestors on the P2P network. In some embodiments of the present invention the one or more programs may further optimize a magnet link by adding, to the magnet link, information about the topology of the underlying network (e.g., IP subnet), and/or the load, including the number of requestors that a given seeder computer system can provide with the boot image at a given time or during a given time period.

Thus, the optimized magnet link, when provided to a requestor computer system by the one or more programs of the first computer system 210, provides the requestor computer system with immediate live peers that can distribute a given boot image to this requestor computer system. Based on receiving a subsequent request for the boot image, the one or more programs provide a new configuration which includes the optimized magnet link. The one or more programs update a boot options record with the configuration information (390).

In some embodiments of the present invention, errors in the workflow 300 are handled based on a P2P protocol. By utilizing the existing functionality in the P2P network 270, the P2P protocol, bad seeders are flushed out. Additionally, in some embodiments of the present invention, any seeder computer system 230a-230b can opt out at any time. When a 230b opts out, one or more programs executing on the first computer system 210 receive a notification and based on this notification, the one or more programs recalculate any dynamic magnet link that previously references these the system(s) that opted out.

As discussed with reference to FIG. 3, the one or more programs that can be referred to as the MLE (e.g., 212, FIG.

Figure 4:
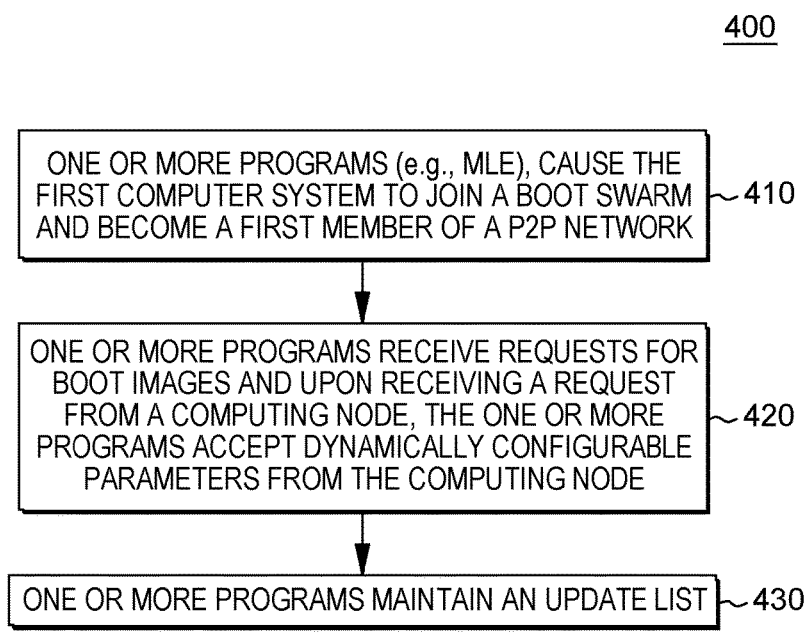
FIG. 4 is a workflow illustrating certain aspects of an embodiment of the present invention.

2) generate and update a magnet link that enables computer systems on a P2P network (e.g., 270, FIG. 2) to boot efficiently from an image available from another computer system in the P2P network. FIG. 4 illustrates a workflow 400 that includes aspects of some embodiments of the present invention and in particular, aspects of the one or more programs receiving and maintaining data to generate and update the magnet links. Like FIG. 3, the workflow 400 of FIG. 4 references items in FIG. 2 for non-limiting illustrative purposes, only.

As aforementioned, in embodiments of the present invention, one or more programs executing on one or more processor of a first computer system 210 (e.g., an MLE 212), initialize a P2P network 270 and join the first computer system 210 as a first member in a boot network (410). The one or more programs receive requests for boot images and upon receiving a request from a computing node (e.g., requestor computer system 220), the one or more programs accept dynamically configurable parameters from the computing node (e.g., a DHCP Server) (420). These parameters may include a point based on the number of times the computing node appeared in the magnet link (e.g., IP_POINTS) and a threshold representing the number of SEEDER IP members in the magnet link (e.g., IP_THRESHOLD). The one or more programs maintain an update list (430). The update list may include, but is not limited to, the IP of the computing node, whether subsequent to booting the computing node became a seeder or not, a network ID, a netmask, and/or the number of times the computing node appeared in the magnet link (e.g., IP_POINTS). In an embodiment of the present invention, the one or more programs provide the list to consumers (e.g., the dynamic IP subsystem).

The one or more programs build an optimized list based on maintaining the update list. To maintain the update list, in embodiments of the present invention, the one or more programs start with an IP of a designated image server of a network. If there are "M" number of IPs with in same subset of the network, the one or more programs build the list of IPs with M−1 seeders and ensure that the last IP is the image server. If there are less than or equals "M−1" IPs, the one or more programs choose IPs from the best matched subnets (e.g., a longest match). In an embodiment of the present invention, the one or more programs check the point(s) by incrementing the IP_POINTS for each IP of the list. At any given point of time, if the IP_POINT of any IP has reached a threshold value or is not yet ranked, the one or more programs place the IP at the end of the list.

Figure 5:
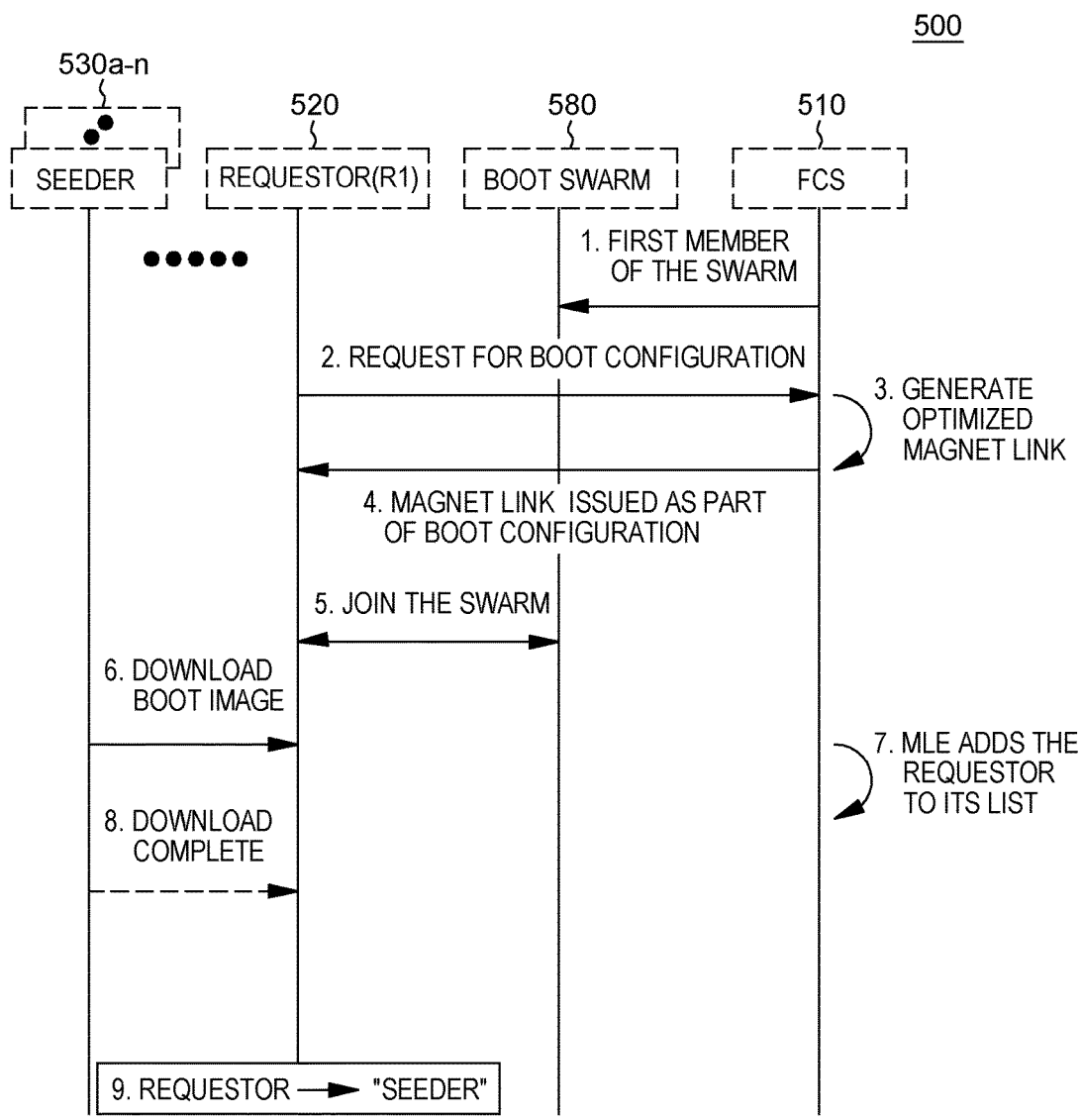
FIG. 5 illustrates aspects of an operational communication flow of embodiment of the present invention.

FIG. 5 illustrates aspects of an operational communication flow of some embodiments of the present invention. As illustrated in FIG. 5, a first computer system (i.e., one or more programs executing on at least one processing circuit of the first computer system) 510 creates a boot swarm 580 to become the first member of a P2P network. The first computer system 510 receives a request from a requestor computer system 520 for a boot image from the P2P network. The first computer system computes a magnet link that contains a list of immediate boot peers. Based on the information in magnet link, the requestor computer system 520 receives the IP configuration for the requestor to join the boot swarm 580 that contains peers that can serve boot images. The requestor computer system 520 downloads the boot image from one or more peers 530*a*-530*n* (i.e., seeder computer systems). The first computer system 510 adds the requestor computer system 520 to its list for optimization purposes. The requestor computer system 520 completes its download of the boot image and becomes a seeder. Although not pictured, based on requestor computer system 520, the first computer system 510 may update the magnet link.

Embodiments of the present invention include a computer-implemented method, a computer system and a computer program product that include one or more programs first computer system connecting the first computer system to a boot swarm, initiating formation of a peer to peer network. The one or more programs receive a request from a second computer system, a request for a file, where the file is selected from the group consisting of: an operating system file and a firmware file. The one or more programs configure the second computer system, where the configuration includes implementing a client application hosted from a resource in the first computer system, to facilitate the second computer system joining the peer to peer network. The one or more programs determine one or more immediate peers in the peer to peer network available to provide the file to the second computer system. The one or more programs generate a magnet link including a listing of addresses of the one or more immediate peers, where an order of the listing indicates rankings from best source to worst source for downloading the file among the one or more immediate peers. The one or more programs provide the second computer system with the magnet link to utilize in downloading the file from a peer of the one or more immediate peers.

In some embodiments of the present invention, the file is a complete boot image. Thus, in some embodiments of the present invention, the one or more programs also obtain, through the client application, verification that the second computer system has joined the boot swarm by downloading complete boot image. The one or more programs determine one or more immediate peers on the peer to peer network capable of receiving the complete boot image from the second computer system and update a boot options record with configuration information of the second computer system.

In some embodiments of the present invention, the one or more programs also determine, based on the client application, that the second computer system has left the boot swarm. The one or more programs remove the configuration information of the second computer system from the boot options record.

In some embodiments of the present invention, the one or more programs receive a request from a third computer system, a request for the file, which can be, for example, a complete boot image. The one or more programs configure the third computer system, where the configuration comprises implementing a client application hosted from the resource in the first computer system, to facilitate the third computer system joining the peer to peer network. The one or more programs determine one or more immediate peers in the peer to peer network available to provide the complete boot image to the third computer system, wherein the second computer system comprises a peer of the immediate peers. The one or more programs generate a magnet link that includes a listing of addresses of the one or more immediate peers available to provide the complete boot image to the third computer system, where an order of the listing indicates rankings from best source to worst source for downloading the complete boot image among the one or more immediate peers available to provide the complete boot image to the third computer system. The one or more programs provide the third computer system with the magnet link to utilize in downloading the complete boot image from a peer of the one or more immediate peers available to provide the complete boot image to the third computer system wherein the magnet link comprises the address of the second computer system.

In some embodiments of the present invention, the configuration includes dynamically configurable parameters of the second computer system. In some embodiments of the present invention, the one or more programs also maintain an update list that includes the boot options records. The one or more programs, when determining the one or more immediate peers, may access the update list to identify the one or more immediate peers. The one or more programs, when generating the magnet link further comprises may obtain the addresses of the one or more peers from the boot option records. The one or more programs may also determine the rankings from the best source to the worst source among the one or more immediate peers. To determine the rankings, in some embodiments of the present invention, the one or more programs utilize one or more elements from the group consisting of: proximity of the one or more peers to the second computer system on the peer to peer network, number of times the one or more peers were each utilized as sources of the file by other computer systems on the peer to peer network, and current load of the one or more peers.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, resources in the first, requestor, seeder, and leecher computer systems can be understood as cloud computing node 10 (FIG. 6) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
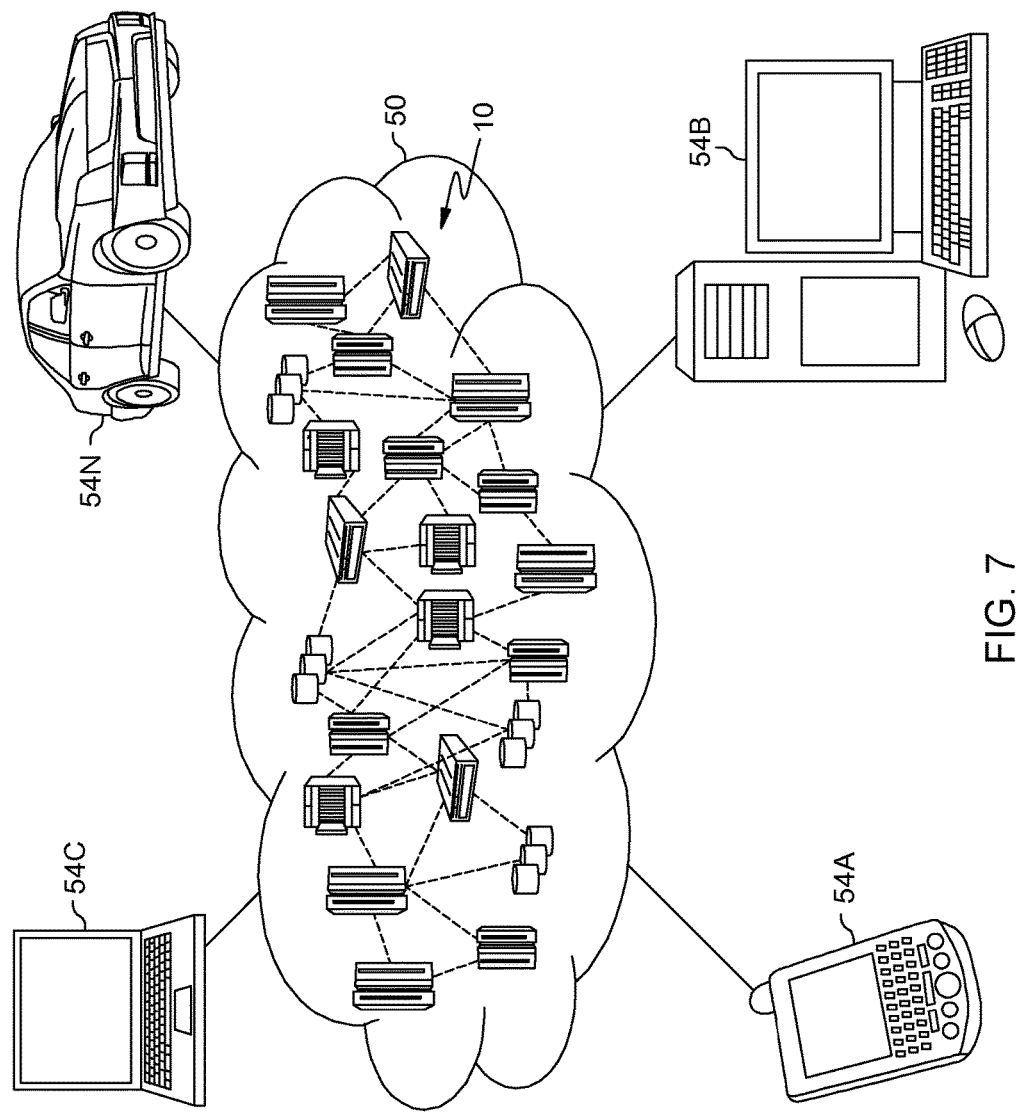
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
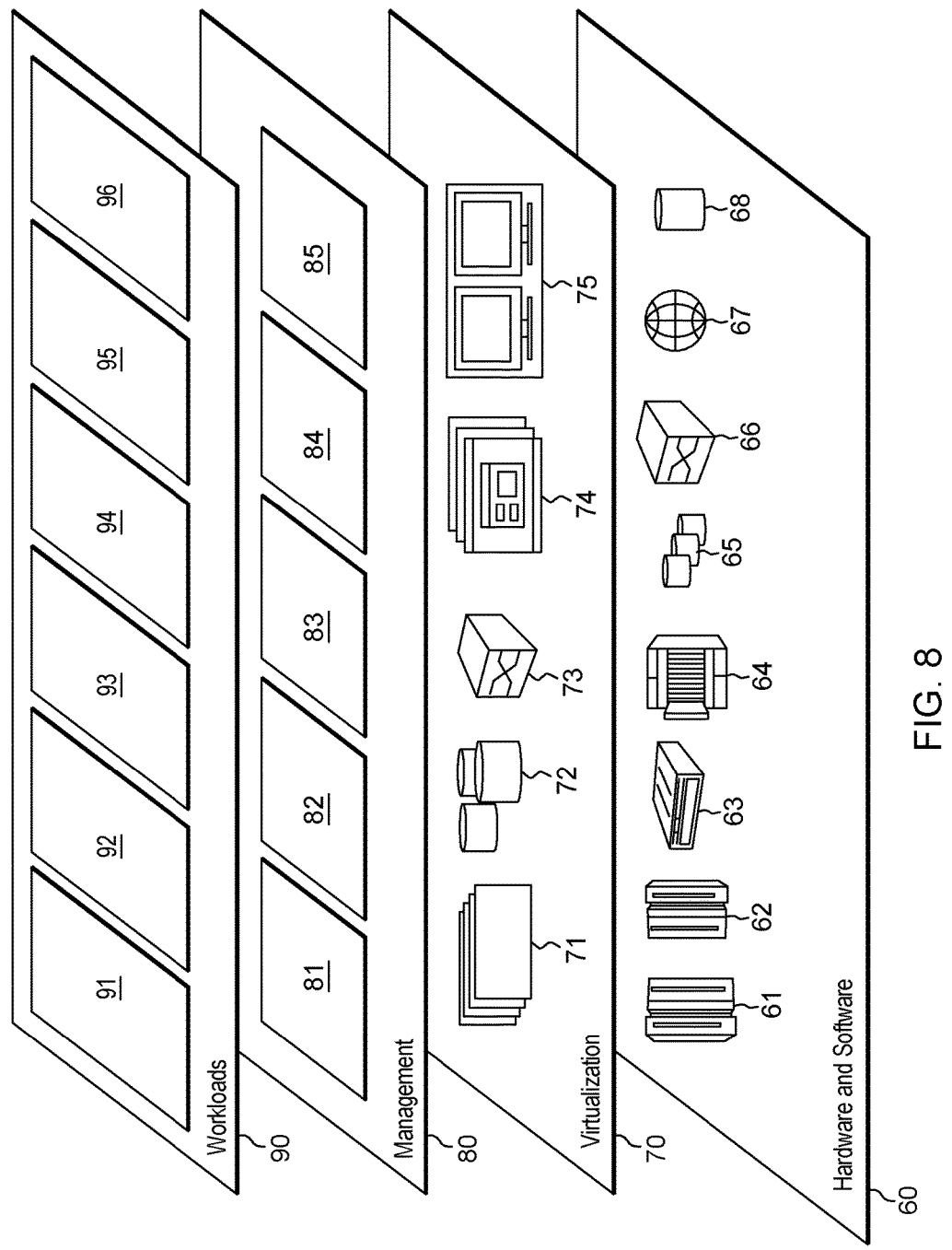
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a boot image to a computer system on a peer to peer network 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
    a computer readable storage medium readable by one or more processors and storing instructions for execution by the one or more processors for performing a method comprising:
        connecting, by the one or more processors of a first computer system, the first computer system to a boot swarm, initiating formation of a peer to peer network;
        receiving, by the one or more processors, a request from a second computer system for a file, wherein the file is selected from the group consisting of: an operating system file and a firmware file;
        configuring, by the one or more processors, the second computer system, wherein the configuration comprises implementing a client application hosted from a resource in the first computer system, to facilitate the second computer system joining the peer to peer network;
        determining, by the one or more processors, one or more immediate peers in the peer to peer network available to provide the file to the second computer system;
        generating, by the one or more processors, a magnet link comprising a listing of addresses of the one or more immediate peers, wherein an order of the listing indicates rankings from best source to worst source for downloading the file among the one or more immediate peers; and
        providing, by the one or more processors, the second computer system with the magnet link to utilize in downloading the file from a peer of the one or more immediate peers.

2. The computer program product of claim 1, wherein the file comprises a complete boot image.

3. The computer program product of claim 2, the method further comprising:
    obtaining, by the one or more processors, through the client application, verification that the second computer system has joined the boot swarm by downloading the complete boot image;
    determining, by the one or more processors, one or more immediate peers on the peer to peer network capable of receiving the complete boot image from the second computer system; and
    updating, by the one or more processors, a boot options record with configuration information of the second computer system.

4. The computer program product of claim 1, the method further comprising:
    determining, by the one or more processors, based on the client application, that the second computer system has left the boot swarm; and
    removing, by the one or more processors, the configuration information of the second computer system from the boot options record.

5. The computer program product of claim 2, the method further comprising:
    receiving, by the one or more processors, a request from a third computer system for the complete boot image;
    configuring, by the one or more processors, the third computer system, wherein the configuration comprises implementing a client application hosted from the resource in the first computer system, to facilitate the third computer system joining the peer to peer network;
    determining, by the one or more processors, one or more immediate peers in the peer to peer network available to provide the boot image to the third computer system, wherein the second computer system comprises a peer of the immediate peers; and
    generating, by the one or more processors, a magnet link comprising a listing of addresses of the one or more immediate peers available to provide the boot image to the third computer system, wherein an order of the listing indicates rankings from best source to worst source for downloading the boot image among the one or more immediate peers available to provide the boot image to the third computer system; and providing, by the one or more processors, the third computer system with the magnet link to utilize in downloading the boot image from a peer of the one or more immediate peers available to provide the boot image to the third computer system, wherein the magnet link comprises the address of the second computer system.

6. The computer program product of claim 1, wherein the configuration comprises dynamically configurable parameters of the second computer system.

7. The computer program product of claim 1, the method further comprising:

maintaining, by the one or more processors, an update list comprising the boot options records.

8. The computer program product of claim 7, wherein determining the one or more immediate peers further comprises:

accessing, by the one or more processors, the update list to identify the one or more immediate peers.

9. A system comprising:
a memory;
one or more processors in communication with the memory; and
program instructions executable by the one or more processors via the memory to perform a method, the method comprising:

connecting, by the one or more processors of a first computer system, the first computer system to a boot swarm, initiating formation of a peer to peer network;

receiving, by the one or more processors, a request from a second computer system for a file, wherein the file is selected from the group consisting of: an operating system file and a firmware file;

configuring, by the one or more processors, the second computer system, wherein the configuration comprises implementing a client application hosted from a resource in the first computer system, to facilitate the second computer system joining the peer to peer network;

determining, by the one or more processors, one or more immediate peers in the peer to peer network available to provide the file to the second computer system;

generating, by the one or more processors, a magnet link comprising a listing of addresses of the one or more immediate peers, wherein an order of the listing indicates rankings from best source to worst source for downloading the file among the one or more immediate peers; and providing, by the one or more processors, the second computer system with the magnet link to utilize in downloading the file from a peer of the one or more immediate peers.

* * * * *